J. M. HERRING.
POTATO DIGGER.
APPLICATION FILED OCT. 8, 1908.
937,303.
Patented Oct. 19, 1909.
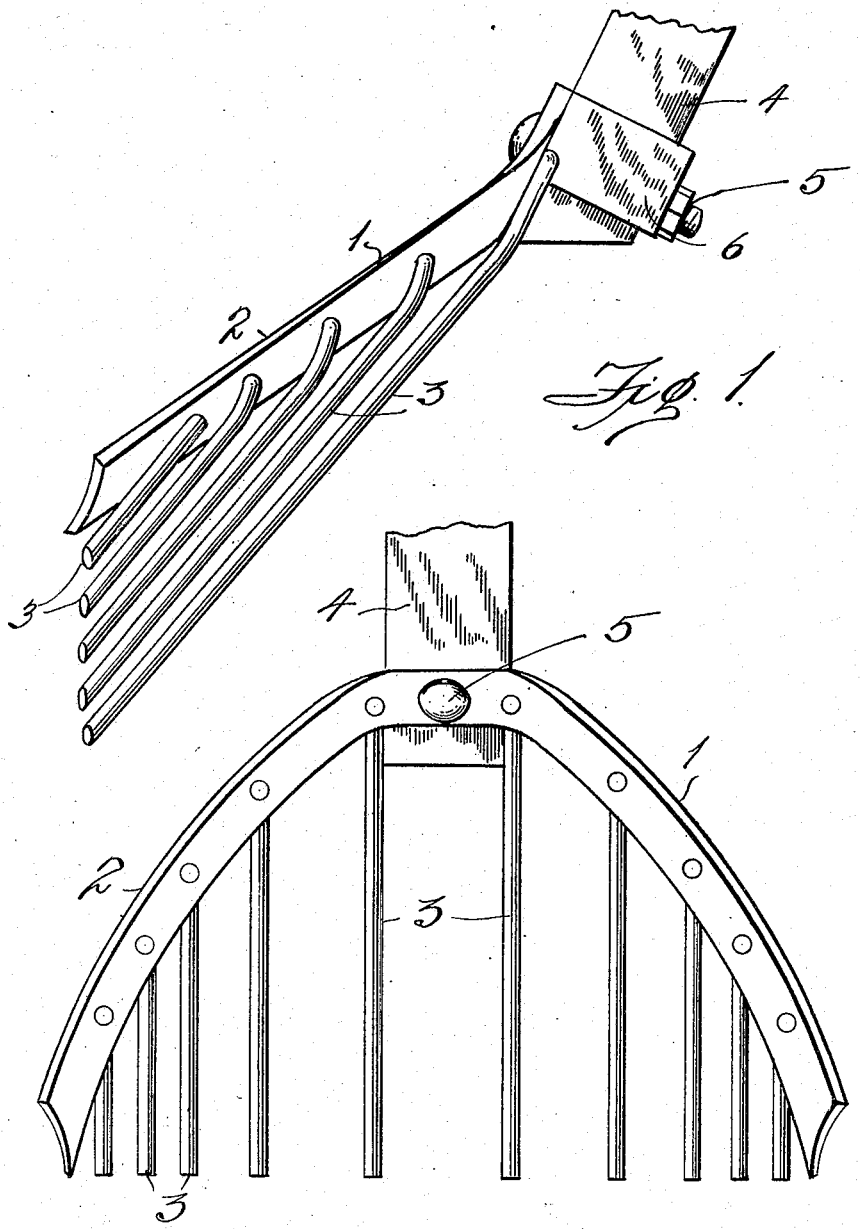

UNITED STATES PATENT OFFICE.

JESIE M. HERRING, OF THORNTON, TEXAS.

POTATO-DIGGER.

937,303.  Specification of Letters Patent.  Patented Oct. 19, 1909.

Application filed October 8, 1908. Serial No. 456,731.

*To all whom it may concern:*

Be it known that I, JESIE M. HERRING, a citizen of the United States, residing at Thornton, in the county of Limestone and State of Texas, have invented certain new and useful Improvements in Potato-Diggers, of which the following is a specification.

My invention relates to new and useful improvements in potato diggers.

The object of the invention is to provide a digger that will separate the potatoes and give the soil ample time to pass between the fingers prior to the passage of the potatoes, thus leaving the potatoes on top; also one which may be successfully operated in various kinds of soil and particularly in "stumpy" land.

Finally the object of the invention is to provide a device of the character described that will be strong, durable, simple and efficient and comparatively inexpensive to construct and also one in which the several parts will not be liable to get out of working order.

With the above and other objects in view, my invention has particular relation to certain novel features of construction and operation, an example of which is described in the following specification and illustrated in the accompanying drawings, wherein:

Figure 1 is a side elevation, and Fig. 2 is a front elevation.

In the drawings, the numeral 1 designates the diggers which are composed of a metal frame or hanger 2 from which fingers 3 extend. The fingers are preferably round in cross section, being suitably secured to the hanger at one end and extending from beneath the hanger downward and forward and forming a structure somewhat resembling a hay fork. The lower ends of the fingers terminate in a line as shown in Fig. 2.

In operation, the digger is secured to the plow standard 4 by a metal loop 6 secured to the hanger and embracing the lower end of the standard. A bolt 5 passed through the parts securely fastens them together. It will be noted that the hanger is supported at an angle, the fingers thus being inclined upward and backward. As the digger is carried forward the fingers enter the soil, causing the same and the potatoes to ride thereonto, but the spaces between the fingers permit the soil to pass rapidly therethrough, while the potatoes being slightly retarded by the fingers following, fall on top of the soil.

The digger will operate in wet soil and the fingers being substantially straight and smooth are less likely to become disarranged or injure the potatoes. The forward ends of the fingers being free, they readily enter the ground and offer less resistance. This is not the case where blades and other obstructions are secured across the ends of the fingers.

What I claim is:

1. A device of the character described comprising a downwardly and forwardly extending yoke shaped hanger, rigid blunt ended fingers downwardly and forwardly projecting from said hanger, and means centrally carried by said yoke adapted to embrace the lower end of a plow standard to secure the hanger to said standard.

2. A device of the character described comprising a downwardly and forwardly extending yoke shaped hanger, rigid blunt ended fingers downwardly and forwardly projecting from said hanger, and means centrally carried by said yoke adapted to embrace the lower end of a plow standard to secure the hanger to said standard, all of said fingers terminating upon the same transverse line.

In testimony whereof I have signed my name to this specification in the presence of two subscribing witnesses.

JESIE M. HERRING.

Witnesses:
R. R. BLACK,
W. A. TERRY.